US009647518B2

(12) United States Patent
Hashimoto et al.

(10) Patent No.: US 9,647,518 B2
(45) Date of Patent: *May 9, 2017

(54) METHOD FOR MANUFACTURING LAMINATED IRON CORE

(71) Applicants: MITSUI HIGH-TEC, INC., Fukuoka (JP); PANASONIC CORPORATION, Osaka (JP)

(72) Inventors: Akihiro Hashimoto, Fukuoka (JP); Tadashi Iida, Fukuoka (JP); Kiyomi Kawamura, Osaka (JP); Koichi Mitamura, Osaka (JP)

(73) Assignees: MITSUI HIGH-TEC, INC., Fukuoka (JP); PANASONIC CORPORATION, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/741,924

(22) Filed: Jun. 17, 2015

(65) Prior Publication Data

US 2015/0372571 A1 Dec. 24, 2015

(30) Foreign Application Priority Data

Jun. 18, 2014 (JP) ................................ 2014-125534

(51) Int. Cl.
*H02K 15/02* (2006.01)
*B21D 28/10* (2006.01)
(Continued)

(52) U.S. Cl.
CPC ............. *H02K 15/03* (2013.01); *B21D 28/10* (2013.01); *B21D 28/22* (2013.01); *B21D 28/246* (2013.01);
(Continued)

(58) Field of Classification Search
CPC ...... H02K 15/02; H02K 15/03; H02K 15/024; Y10T 156/1075; Y10T 156/1002;
(Continued)

(56) References Cited

U.S. PATENT DOCUMENTS 6,636,137 B1 * 10/2003 Neuenschwander .. B21D 28/02
29/596
2008/0276446 A1 11/2008 Amano et al.
(Continued)

FOREIGN PATENT DOCUMENTS

| DE | 10227129 | 1/2004 |
|----|----------|--------|
| JP | 2006-050821 | 2/2006 |
| JP | 2008-042967 | 2/2008 |

OTHER PUBLICATIONS

U.S. Appl. No. 14/742,012 to Akihiro Hashimoto et al., filed Jun. 17, 2015.
(Continued)

*Primary Examiner* — Linda L Gray
(74) *Attorney, Agent, or Firm* — Greenblum & Bernstein, P.L.C.

(57) ABSTRACT

In a method for manufacturing a laminated iron core from a thin sheet, the method includes coining the thin sheet from below to form a thinned bridge portion on an outer peripheral portion of an iron core piece, blanking the iron core piece from the thin sheet from above or below after forming the bridge portion, and laminating the iron core piece on another iron core piece to manufacture the laminated iron core.

10 Claims, 7 Drawing Sheets

(51) Int. Cl.
*H02K 15/03* (2006.01)
*B65H 35/00* (2006.01)
*B21D 28/26* (2006.01)
*B21D 28/24* (2006.01)
*B21D 28/22* (2006.01)

(52) U.S. Cl.
CPC .......... *B21D 28/26* (2013.01); *B65H 35/0006* (2013.01); *B65H 35/008* (2013.01); *H02K 15/02* (2013.01); *H02K 15/024* (2013.01); *Y10T 156/1002* (2015.01); *Y10T 156/1056* (2015.01); *Y10T 156/1075* (2015.01); *Y10T 156/13* (2015.01); *Y10T 156/1304* (2015.01)

(58) Field of Classification Search
CPC ............. Y10T 156/1056; Y10T 156/13; Y10T 156/1304; B65H 35/0006; B65H 35/008; B21D 28/10; B21D 28/22; B21D 28/246; B21D 28/26; B21D 28/265; B21D 35/00
See application file for complete search history.

(56) References Cited

U.S. PATENT DOCUMENTS

2010/0083486 A1   4/2010   Amano et al.
2011/0179633 A1   7/2011   Amano et al.

OTHER PUBLICATIONS

Office Action issued in Germany Counterpart Patent Appl. No. 102015210885.6, dated Mar. 18, 2016, along with an English translation thereof.

\* cited by examiner (A)

(B)

(A)

(B)

(C)

(A)

(B)

(A)

(B)

(A)

(B)

(C)

METHOD FOR MANUFACTURING LAMINATED IRON CORE

CROSS REFERENCE TO RELATED APPLICATIONS

This application is based upon and claims the benefit of priority of Japanese Patent Application No. 2014-125534 filed on Jun. 18, 2014, the contents of which are incorporated herein by reference in its entirety.

BACKGROUND OF THE INVENTION

1. Field of the Invention

The present invention relates to a method for manufacturing a laminated iron core (a rotor-laminated iron core or a stator-laminated iron core) having multiple punched holes in its circumferential direction, using a motor.

2. Description of the Related Art

Recently, as disclosed in JP-A-2008-42967, there has been spread a motor using a rotor structured such that its rotor-laminated iron core having an axial hole in its center includes multiple magnet-insert holes in which corresponding permanent magnets are inserted and respectively resin-sealed.

However, when closed magnet-insert holes are formed in the rotor-laminated iron core, magnetic flux directed toward the front and back of permanent magnets forms a magnetic path in the outer peripheral portion of the magnet-insert holes, thereby reducing the magnetic efficiency of the rotor. Thus, as shown in (A) to (C) of FIG. 7, there is proposed a method in which a bridge portion 71 formed between the end and outer periphery of a magnet-insert hole 70 of an iron core piece 72 forming a rotor-laminated iron core is plastically deformed by pressing to make the thickness of the plastic-deformed portion thinner than those of the remaining portions, thereby preventing an increase in torque variations, reducing the leakage magnetic flux and thus improving the efficiency of the motor (see JP-A-2006-50821). Here, FIG. 7 shows an axial hole 73, a punch 74, a die 75 and a scrap piece 76.

Patent Literature 1: JP-A-2008-42967
Patent Literature 2: JP-A-2006-50821

SUMMARY OF THE INVENTION

However, in the case that the iron core piece 72 forming the rotor-laminated iron core disclosed in JP-A-2006-50821 is formed by blanking using a progressive die, especially, in the case that, in forming the bridge portion 71, thin-wall processing is performed from the upper surface side of the iron core piece 72, in outer-shape blanking, there are produced clearances 77 between the punch 74 and the bridge portions 71, whereby the punch 74 is disabled to touch the bridge portions 71 and thus the bridge portions 71 can be deformed outward in the radial direction (toward the outer peripheral edge of the iron core piece). Also, in the case that the bridge portions 71 are formed to extend over the outer peripheral edge of the iron core piece 72 and magnet-insert holes 70, such deformation is transmitted to the magnet-insert holes 70 as well.

Here, such problems arise similarly not only in the magnet-insert holes but also in other punched holes formed in the iron core piece.

The present invention has a non-limited object to provide a laminated iron core manufacturing method which, in punching or blanking an iron core piece, can prevent deformation of bridge portions formed between punched holes and the outer peripheral edge of the iron core piece.

A first aspect of the present invention provides a method for manufacturing a laminated iron core from a thin sheet, the method including: coining the thin sheet from below to form a thinned bridge portion on an outer peripheral portion of an iron core piece; blanking the iron core piece from the thin sheet from above or below after forming the bridge portion; and laminating the iron core piece on another iron core piece to manufacture the laminated iron core.

A second aspect of the present invention provides a method according to the first aspect, wherein blanking of the iron core piece from below is performed while applying a projection portion formed on a blanking punch to the bridge portion from below.

A third aspect of the present invention provides a method for manufacturing a laminated iron core from a thin sheet, the method including: coining the thin sheet from below to respectively form thinned bridge portions between areas for punched holes and an outer peripheral edge of an iron core piece, wherein the areas for punched holes are located at radial direction outside area of the iron core piece; forming the punched holes by punching the areas for punched holes after forming the bridge portions; blanking the iron core piece from the thin sheet by using a blanking punch and die; and laminating the iron core piece on another iron core piece to manufacture the laminated iron core.

A fourth aspect of the present invention provides a method according to the third aspect, wherein the punched holes are magnet-insert holes.

A fifth aspect of the present invention provides a method according to the fourth aspect, wherein forming the magnet-insert holes is performed by lowering a punch, and a radial direction outside end of the magnet-insert hole bent in punching process is pushed back by a correcting die in a later process.

A sixth aspect of the present invention provides a method according to the fourth aspect, wherein forming the magnet-insert holes is performed by raising a punch A seventh aspect of the present invention provides a method according to the fourth aspect, wherein forming the magnet-insert holes is performed by lowering a punch, while holding the bridge portion adjoining the magnet-insert hole by a projection portion of a lower die An eighth aspect of the present invention provides a method according to the fourth aspect, wherein the iron core piece is blanked, while holding the bridge portion existing in an outside area of the iron core piece from below by a projection portion of the die.

In the method for manufacturing the laminated iron core according to any of the first to eighth aspects, since, after the bridge portion is formed, the thin sheet is blanked to form the iron core piece, the iron core piece having a specific shape can be obtained regardless of the forming position of the bridge portion.

Especially, since coining for forming the bridge portion is performed from below, when blanking the iron core piece is performed from above, the bridge portion is hard to be deformed.

Here, when blanking the iron core piece is performed from below, the bridge portion to be separated can be partially deformed but, in the case that such portion (punched hole) exists in the scrap piece, there is no problem.

Especially, in the method of the second aspect, since the iron core piece blanking is performed from below while the projection portion of the blanking punch is contacted with the bridge portion from below, the bridge portion can be prevented against deformation.

Also, in the method of any of the third to eighth aspects, since, in blanking into outer-shape performed from above by the blanking punch, the blanking punch supports the iron core piece without producing a clearance between the blanking punch and bridge portion, the bridge portion is prevented from being deformed outward in the radial direction.

In the method of any of the fourth to eighth aspects, since the punched holes are the magnet-insert holes, by forming the bridge portion, magnetic flux leakage can be reduced, thereby enabling formation of a higher-efficiency motor.

In the method of the fifth aspect, the punching of the magnet-insert hole is performed by lowering the punch, and the radial-direction outside end of the magnet-insert hole bent in punching is pushed back by the correcting die in the later process, thereby reducing deformation of the bridge portion partially bent by the punch.

In the method of the sixth aspect, since the punching of the magnet-insert hole is performed by raising the punch, deformation of the peripheral edge of the magnet-insert hole can be prevented.

In the method of the seventh aspect, since the punching of the magnet-insert hole is performed by lowering the punch, while the bridge portion adjoining the magnet-insert hole is held by the projection portion of the lower die, the bridge portion can be prevented against deformation.

Further, in the method of the eighth aspect, the iron core is blanked while the bridge portion existing in the outside area of the iron core piece is held from below by the projection portion of the die. This can prevent the bridge portion against deformation.

DETAILED DESCRIPTION OF THE EXEMPLARY EMBODIMENTS

Figure 1:
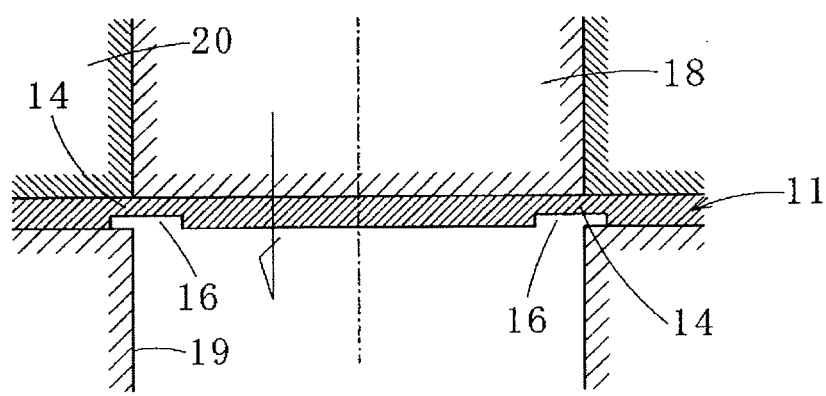
FIG. 1 includes process explanatory views (A) and (B) of a laminated iron core manufacturing method according to a first embodiment of the present invention.
Figure 1:
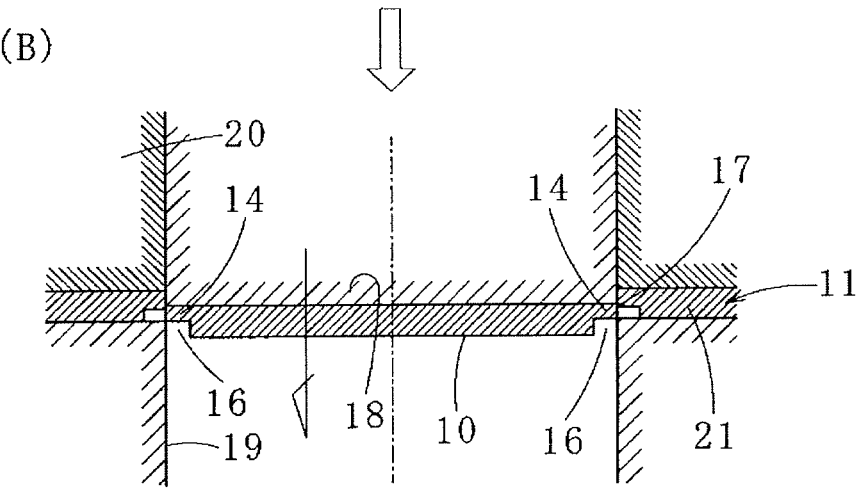

Description is given below of embodiments of the present invention with reference to the accompanying drawings.

In a laminated iron core manufacturing method according to a first embodiment of the present invention, multiple pilot holes (not shown) for determining the forming position of a required iron core piece 10 (see FIGS. 1 2A and 2B) are formed in a thin sheet 11 made of a silicon steel sheet. With these pilot holes as reference, an axial hole 12 and the like are formed by punching. Punching of the axial hole 12 may be performed first or after a coining processing to be described below.

According to the pilot holes, the forming positions of multiple magnet-insert holes (an example of punched holes) to be formed in the radial-direction outside area of the iron core piece 10, thin bridge portions 14 to be formed on the radial-direction outside thereof (which includes the space between the magnet-insert holes 13 and the outer peripheral edge of the iron core piece 10), and caulked portions (not shown) are determined respectively. In this embodiment, as shown in (A) of FIG. 1, the bridge portions 14 are formed first in the thin sheet 11 by coining. Since coining the thin sheet 11 can deform the thin sheet 11, coining (crushing) is performed first. Coining is a technology which plastically processes a portion of the thin sheet 11 to thin such portion, while thickness after coined may be about 50 to 80% of the thin sheet 11. Here, the above process can be applied to laminated iron core manufacturing methods according to the second to fifth embodiments of the present invention which are described later.

Coining of the thin sheet 11 is performed from the back side thereof (from below). That is, using a lower die (not shown) including upward projecting bulged portions at specific portions and an upper die having a flat bottom surface (neither of which is shown), by pushing up the lower die or by pushing down the upper die, the bridge portions 14 are formed at specific positions in the thin sheet 11. Each bridge portion 14 has a dent section 16 on its bottom surface, while the upper surface of the bridge portion 14 is flat with respect to the front surface of the iron core piece 10. As shown in FIG. 1, the bridge portion 14 of the thin sheet 11 is formed to extend beyond the outer peripheral edge 17 of the iron core piece 10. The coining processing from below may be also formed by moving upward a punch having a projection on its upper surface, instead of the lower die having the bulged portion.

In this state, the iron core piece 10 forming area of the thin sheet 11 is pressed to form a required number of magnet-insert holes 13 and caulked portions.

When forming the caulked portions, according to a conventional method, in the first (existing at the bottom position) iron core piece 10, there is formed a caulked through hole; and, in iron core pieces 10 to be laminated on the first piece, there are formed ordinary caulked portions (for example, V-shaped caulked portions). Here, in this embodiment, the iron core pieces are laminated together by a laminating technique using caulking. However, this is not limitative but, for example, other laminating techniques such as adhesion and welding may be also used, while lamination may be performed within or outside the die.

Figure 2A:
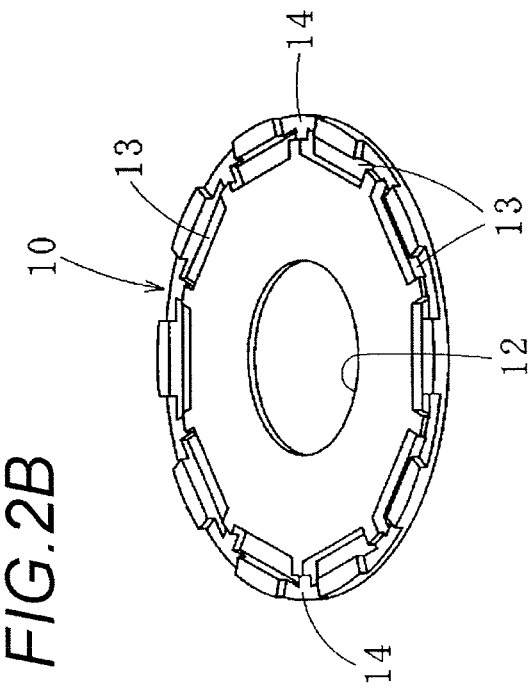
FIG. 2A is a front side perspective view of an iron core piece manufactured by applying the laminated iron core manufacturing method.
Figure 2B:
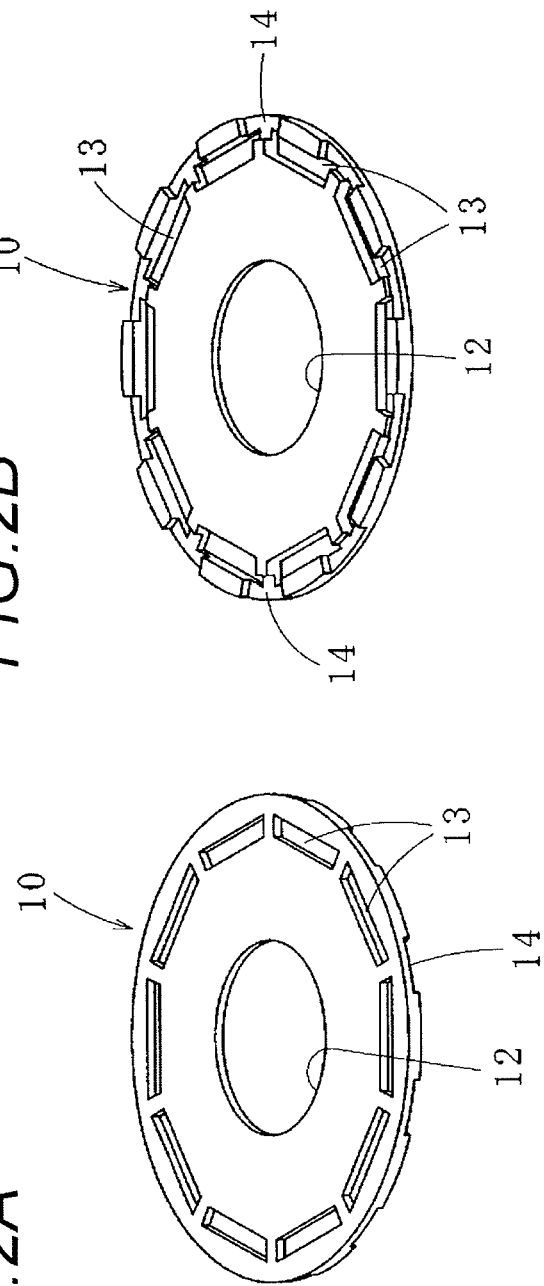
FIG. 2B is a back side perspective view of the iron core piece.

After then, as shown in (B) of FIG. 1, using a punch (a blanking punch) 18, iron core pieces 10 are sequentially blanked from the thin sheet 11 into a die 19 and are caulked and laminated within the die 19 (accurately, squeeze ring). FIG. 1 shows operation states before and after the iron core pieces 10 are blanked into the die 19 using the punch 18 and the die 19. A stripper plate 20 is also provided. FIGS. 2A and 2B respectively show the front side and back side of the iron core piece 10 blanked in outer-shape by the punch 18 and the die 19.

In the above-described laminated iron core manufacturing method of the first embodiment, since blanking processing is performed while a cutter (the blade portion of the punch 18) always contacts the bridge portion 14 of the iron core piece 10 to be cut by the punch 18, the bridge portion 14 existing in the iron core piece 10 is prevented against bending and deformation. Meanwhile, in the case of the bridge portion 14 existing on the radial direction outside of the iron core piece 10, since no support is provided in the punching direction, it tends to bend downward. However, since the bent portion becomes a portion of the scrap piece 21, it has no influence on the precision of the iron core piece 10.

Figure 3:
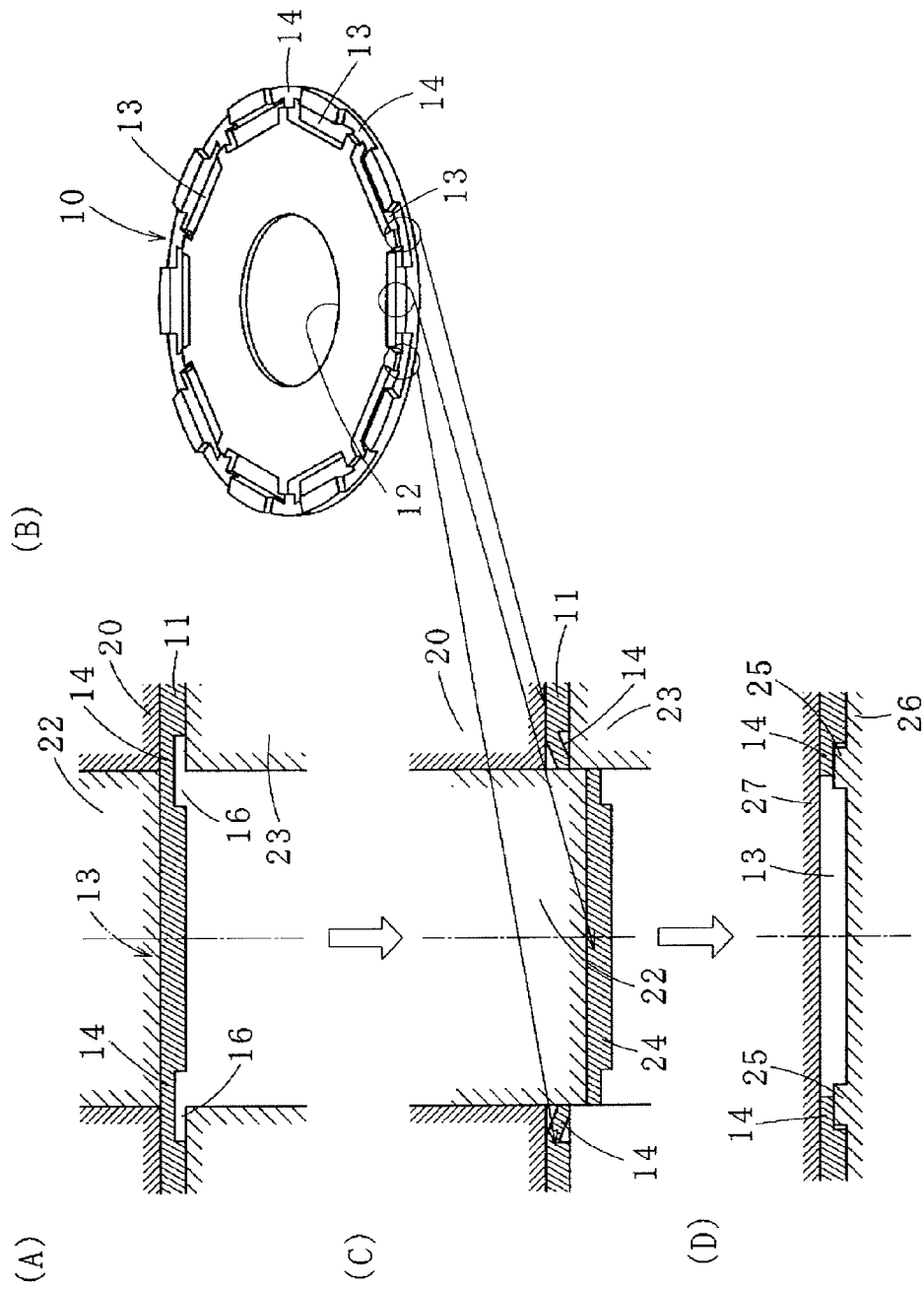
FIG. 3 includes explanatory views (A) to (D) of a laminated iron core manufacturing method according to a second embodiment of the present invention.

Next, referring to (A) to (D) of FIG. 3, description is given of a laminated iron core manufacturing method according to a second embodiment of the present invention. The same constitute elements as those of the iron core piece 10 manufactured according to the laminated iron core manufacturing method of the first embodiment are given the same numerals and thus the specific description thereof is omitted here.

According to a method similar to the laminated iron core manufacturing method of the first embodiment, areas connecting together the magnet-insert holes 13 and the outer peripheral edges 17 of the iron core pieces 10 are coined from below to form dent sections 16, thereby forming bridge portions 14.

After then, through the processes of (A), (C) and (D) of FIG. 3, there are formed magnet-insert holes 13. As shown in (C) of FIG. 3, when the magnet-insert holes 13 are punched using a downward-moving punch 22 and a stationary die 23, the bridge portions 14 extended to the ends of the magnet-insert holes 13 are bent downward. The reason for this is that, since there is nothing to support the downward movement of the bridge portion 14 formed in the iron core pieces 10, adjoining the magnet-insert hole 13, it is pulled downward by a scrap piece 24 produced when forming the magnet-insert hole 13.

As a countermeasure, as shown in (D) of FIG. 3, a correcting die 26 having a projecting correcting portion 25 is applied to the deformed bridge portion 14 of the iron core piece 10 to push it back, thereby enabling the bridge portion 14 to maintain its horizontal state. That is, the radial-direction outside end of the magnet-insert hole 13 bent in coining is pushed back by the correcting die 26. Here, the stripper plate 27 of the bottom plane opposed to the correcting die 26 (or upper die) serves as an upper support for the bridge portion 14.

Next, similarly to the laminated iron core manufacturing method of the first embodiment (see (A) and (B) of FIG. 1), the iron core piece 10 is blanked into the die 19 using the punch 18 and the die 19.

Figure 4:
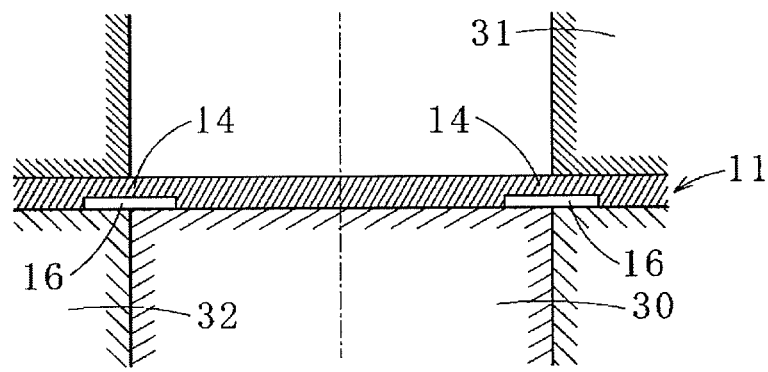
FIG. 4 includes explanatory views (A) to (C) of a laminated iron core manufacturing method according to a third embodiment of the present invention.
Figure 4:
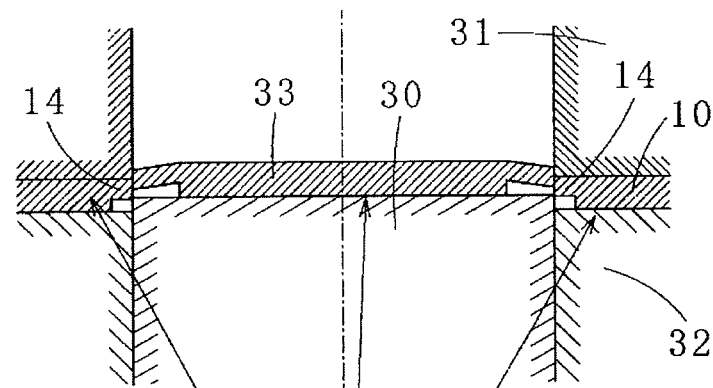
Figure 4:
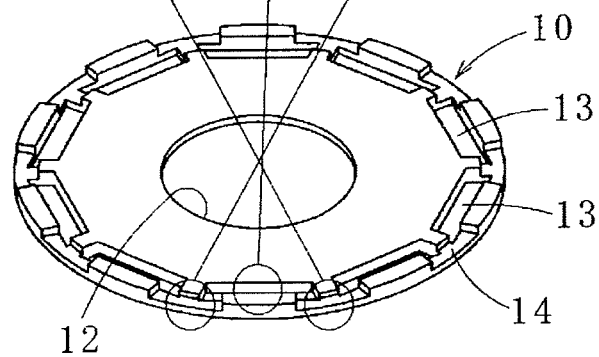

Next, description is given of a laminated iron core manufacturing method according to a third embodiment of the present invention with reference to (A) to (C) of FIG. 4.

In this embodiment as well, the thin sheet 11 for forming the iron core piece 10 is coined from below, whereby a bridge portion 14 having a dent section 16 on its lower side is formed between the magnet-insert hole 13 and the outer peripheral edge of the iron core piece 10.

Since the bridge portion 14 extends over the forming area of the magnet-insert hole 13, when the magnet-insert hole 13 is punched by a downward-moving punch and a die, as described in the second embodiment, a bridge portion 14 adjoining the magnet-insert hole 13 is bent downward.

As a countermeasure, in this embodiment, an upward-moving punch 30 is disposed on the lower side of the thin sheet 11 and a die 31 is disposed on the upper side thereof. A punch guide 32 is also provided. Since the bridge portion 14 of the iron core piece 10 as a product is punched while it is supported by the die 31, it is prevented against deformation. Meanwhile, an area, in which the scrap piece 33 of the magnet-insert hole 13 is produced and which is situated in the bridge portion 14, i.e., the end of the magnet-insert hole 13 is deformed. However, since the area becomes a scrap, no problem is raised.

Figure 5:
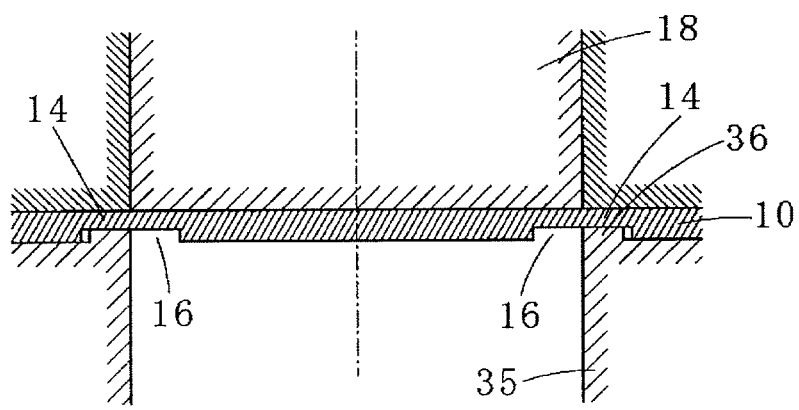
FIG. 5 includes explanatory views (A) and (B) of a laminated iron core manufacturing method according to a fourth embodiment of the present invention.
Figure 5:
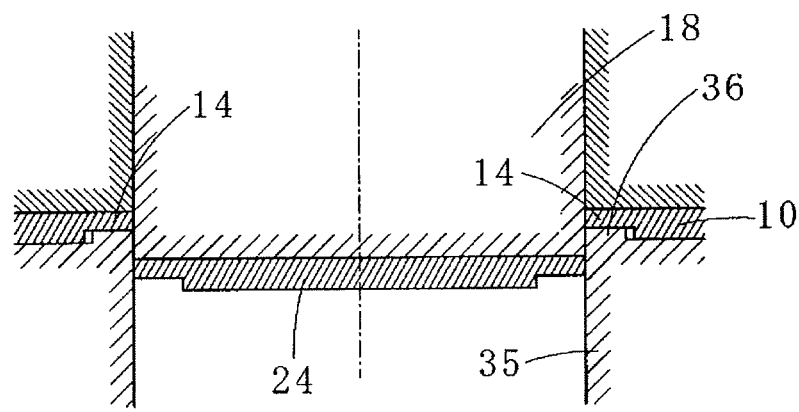

Next, referring to (A) and (B) of FIG. 5, description is given of a laminated iron core manufacturing method according to a fourth embodiment of the present invention.

In this embodiment as well, the thin sheet 11 for forming the iron core piece 10 is coined from below, whereby a bridge portion 14 having a dent section 16 on its lower side is formed between the magnet-insert hole 13 and the outer peripheral edge of the iron core piece 10.

In the method of (A) and (B) of FIG. 5 explaining how to form the magnet-insert hole 13, while a portion connecting together the magnet-insert hole 13 and iron core piece 10 (bridge portion 14 adjoining the magnet-insert hole 13) is held by a projecting portion 36 formed in a lower die 35, the punch 18 is moved down from above to punch down a scrap piece 24, thereby forming the magnet-insert hole 13. In this case, the bridge portion 14 formed on the iron core piece 10 side is prevented against deformation because it is supported by the lower die 35.

Although the method shown in (A) and (B) of FIG. 5 is applied in forming the magnet-insert hole 13, it can be also applied in blanking the iron core piece 10 from the thin sheet 11. In this case, while a projecting portion is formed on the die and a bridge portion 14 existing in the outside area of the iron core piece 10 is held from below, blanking is performed using a blanking punch.

Figure 6:
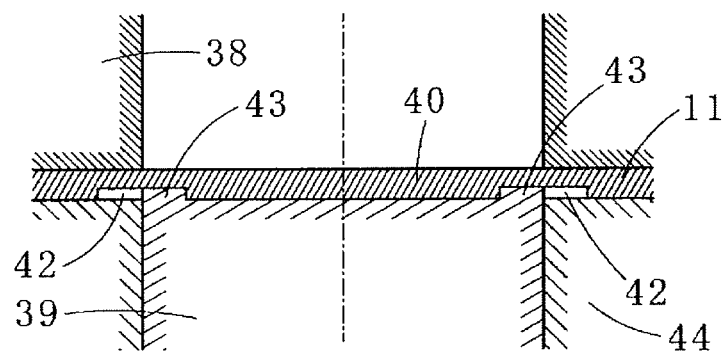
FIG. 6 includes explanatory views (A) and (B) of a laminated iron core manufacturing method according to a fifth embodiment of the present invention.
Figure 6:
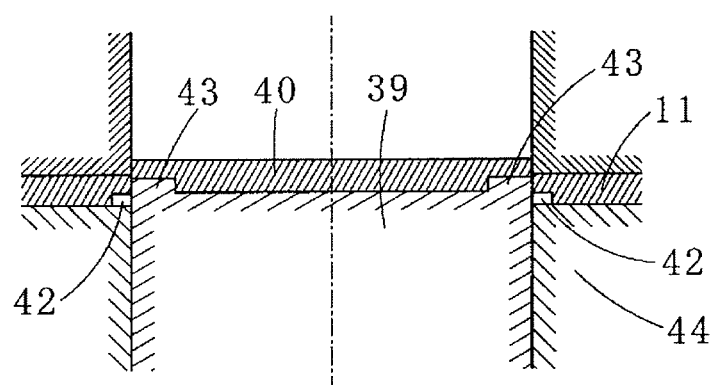
Figure 7:
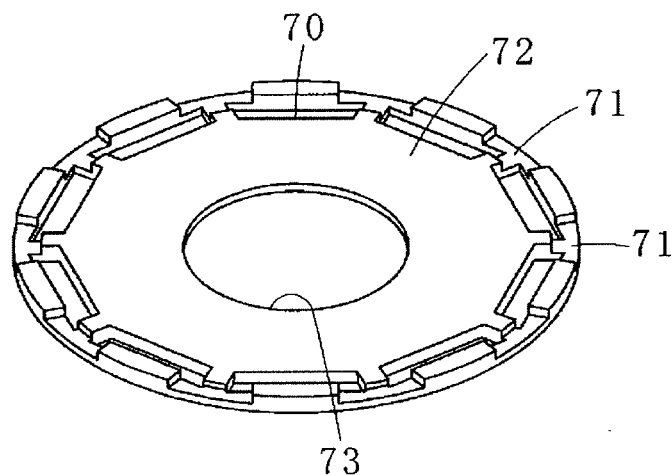
FIG. 7 includes a front side perspective view (A) of an iron core piece manufactured according to a conventional laminated iron core manufacturing method, and process explanatory views (B) and (C) of the laminated iron core manufacturing method.
Figure 7:
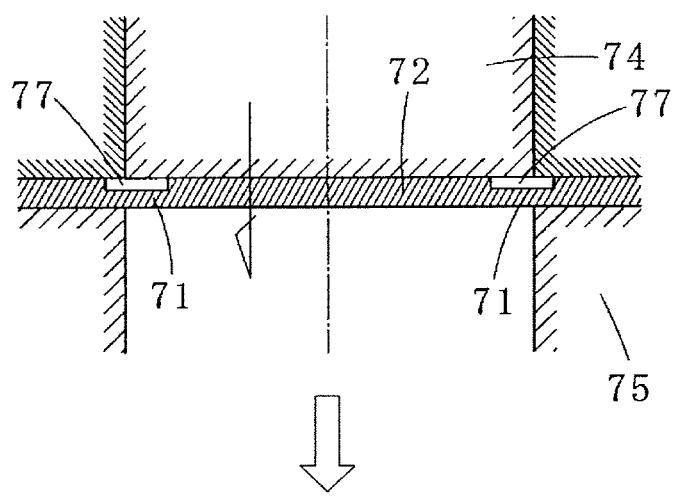
Figure 7:
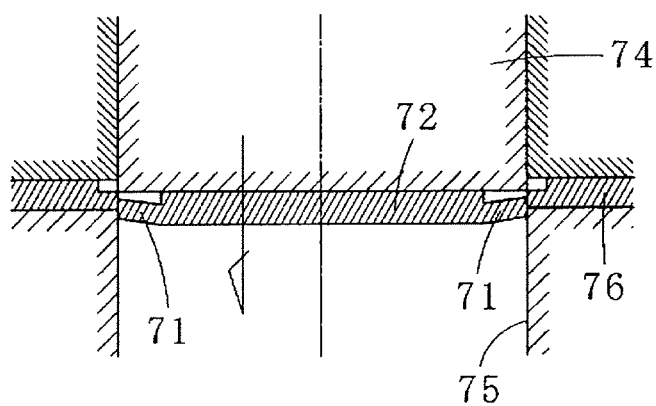

Next, referring to (A) and (B) of FIG. 6, description is given of a laminated iron core manufacturing method according to a fifth embodiment of the present invention.

In this embodiment, coining from below is similar to the above-mentioned other embodiments. Namely, a die 38 is fixed and a punch (blanking punch) 39 is moved upward from below to thereby punch an iron core piece 40 (or other part) into an outer shape. In this case, on the outside of the punch 39, there is formed a projection portion 43 fittable into the coining area 42 of the iron core piece 40. A punch guide 44 is also provided.

With the projection portion 43 of the punch 39 contacted with the bridge portion from below, the iron core piece 40 is blanked, thereby preventing the coining area 42 (that is, bridge portion) of the iron core piece 40 against bending and deformation.

The present invention is not limited to the above-mentioned embodiments, but can be also varied in structure without changing the subject matter thereof. For example, the shapes and number of the magnet-insert holes and the like are arbitrary and, further, the shape and position of the bridge portion are not limited to the above embodiments.

Also, the application of the present invention is not limited to the rotor-laminated iron core but it can be also applied to a stator-laminated iron core so long as it has a bridge portion on its outer peripheral portion.

What is claimed is:
1. A method for manufacturing a laminated iron core from a thin sheet, the method comprising:
coining the thin sheet from below to form a thinned bridge portion on an outer peripheral portion of an iron core piece;

blanking the iron core piece from the thin sheet from above or below after forming the bridge portion; and laminating the iron core piece on another iron core piece to manufacture the laminated iron core.

2. The method according to claim 1, wherein blanking of the iron core piece from below is performed while applying a projection portion formed on a blanking punch to the bridge portion from below.

3. A method for manufacturing a laminated iron core from a thin sheet, the method comprising:
coining the thin sheet from below to respectively form thinned bridge portions between areas for punched holes and an outer peripheral edge of an iron core piece, wherein the areas for punched holes are located at radial direction outside area of the iron core piece;
forming the punched holes by punching the areas for punched holes after forming the bridge portions;
blanking the iron core piece from the thin sheet by using a blanking punch and die; and
laminating the iron core piece on another iron core piece to manufacture the laminated iron core.

4. The method according to claim 3, wherein the punched holes are magnet-insert holes.

5. The method according to claim 4, wherein forming the magnet-insert holes is performed by lowering a punch, and a radial direction outside end of the magnet-insert hole bent in punching process is pushed back by a correcting die in a later process.

6. The method according to claim 4, wherein forming the magnet-insert holes is performed by raising a punch.

7. The method according to claim 4, wherein forming the magnet-insert holes is performed by lowering a punch, while holding the bridge portion adjoining the magnet-insert hole by a projection portion of a lower die.

8. The method according to claim 4, wherein the iron core piece is blanked, while holding the bridge portion existing in an outside area of the iron core piece from below by a projection portion of the die.

9. The method according to claim 1, wherein a dent of the bridge portion faces away from a contact surface of a blanking punch used in the blanking of the iron core.

10. The method according to claim 2, further comprising:
a dent of the bridge portion has a width in the radial direction that is larger than the width of the projection portion so as to define a radially outward clearance between an outer side surface of the projection portion and an outer side surface of the dent.

* * * * *